Figure 1:
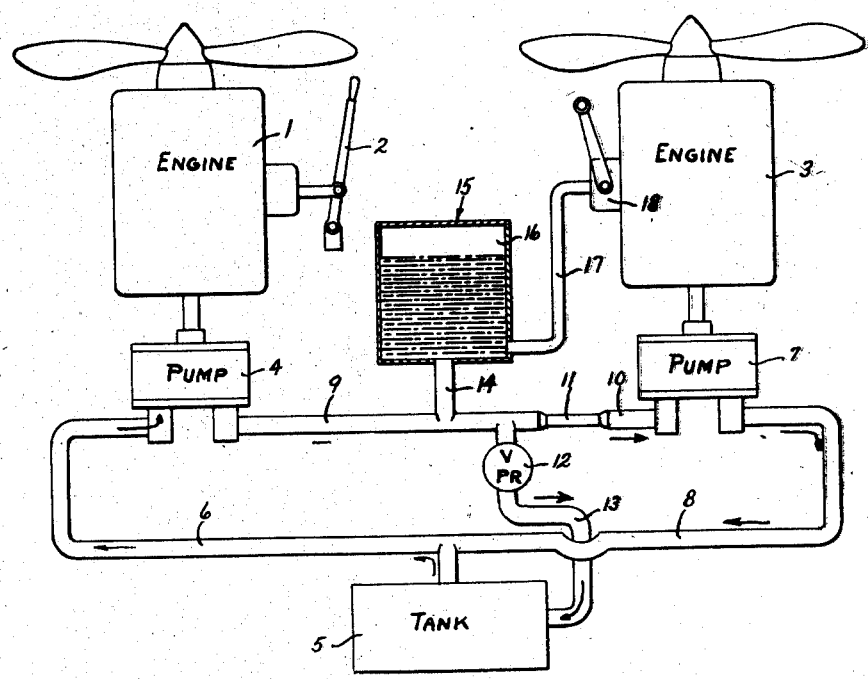

April 21, 1942.  H. A. TOULMIN, JR  2,280,203
MECHANISM FOR SYNCHRONIZING MULTIPLE PRIME MOVERS
Original Filed March 13, 1939

Inventor
HARRY A. TOULMIN, Jr.,
Toulmin & Toulmin
Attorneys

Patented Apr. 21, 1942

2,280,203

UNITED STATES PATENT OFFICE 2,280,203

MECHANISM FOR SYNCHRONIZING MULTIPLE PRIME MOVERS

Harry A. Toulmin, Jr., Dayton, Ohio, assignor to The Hydraulic Development Corporation, Inc., Wilmington, Del., a corporation of Delaware Original application March 13, 1939, Serial No. 261,678. Divided and this application December 4, 1939, Serial No. 307,441

9 Claims. (Cl. 60—97)

This invention relates to mechanism for synchronizing multiple prime movers. While the invention will be described with particular reference to the synchronizing of a plurality of airplane engines, it is equally applicable to the synchronizing of other prime movers.

This application is a division of my copending application Serial No. 261,678, filed March 13, 1939, and abandoned December 10, 1940.

The principal object of the present invention is to provide hydraulic mechanism for the synchronization of multiple prime movers.

Another object is to devise such a synchronizing mechanism wherein hydraulic conduits are the sole connecting means between the several prime movers.

Another object is to devise such a mechanism wherein the speed of one motor known as a master motor is controlled manually and the speed of the subsidiary motor or motors is automatically made synchronous with the speed of the master motor.

Yet another object is to provide a device for synchronizing a subsidiary prime mover with a master prime mover or with a device giving a reference speed which is constant or controllable at the will of the operator, which synchronizing device insures the smoother operation of the subsidiary prime mover or movers by eliminating undue sensitivity of response; in this way minute instantaneous changes in speed in the master prime mover are not transmitted to the subsidiary prime mover, and yet the subsidiary prime mover is driven at a speed which over a finite period of time equals the speed of the master prime mover.

Still another object is to provide a synchronizing device wherein pumps connected in series and driven respectively by the master or reference device and the subsidiary prime mover are provided with means therebetween for maintaining a positive pressure therebetween at all times whereby the throttle or speed control device of the subsidiary prime mover is maintained at the synchronizing setting and a more positive and effective operation results; in a preferred form this is attained by the provision of a restriction in the conduit connecting the two pumps in series, this restriction being located at a point between the point where the fluid pressure is taken off from this conduit to actuate the throttle or other speed control device of the subsidiary prime mover, and the pump driven by the subsidiary prime mover.

Figure 2:
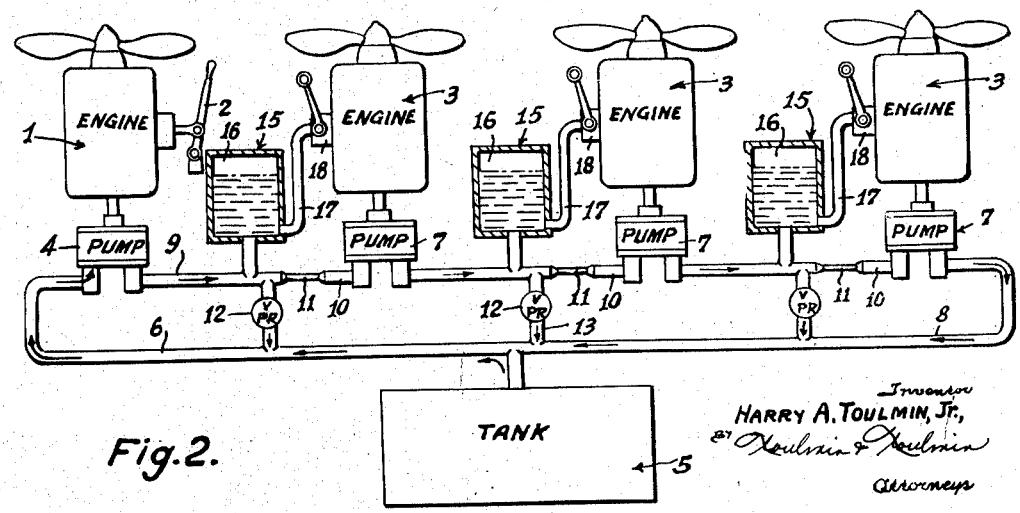

These and other objects and advantages of the invention will appear more clearly from the following specification in connection with the accompanying drawing, in which:

Figure 1 shows a synchronizing device according to the invention for synchronizing two engines, and Figure 2 shows a synchronizing device for synchronizing more than two engines.

According to the present invention the master and subsidiary engine or engines have associated therewith a pump and the pumps are connected in series, while a surge tank and a restriction are provided in the conduit connecting two succeeding pumps. The pressure developed ahead of the restriction is conveyed to an engine speed controlling mechanism such as the throttle of the subsidiary engine.

Referring to Figure 1 of the drawing in detail, reference numeral 1 designates the master engine, the speed of which is controlled manually by the hand throttle 2. 3 designates the subsidiary engine whose speed is to be governed by and synchronized with the speed of engine 1. Engine 1 drives by any suitable power take-off means, a hydraulic pump 4 at a speed directly proportional to the speed of engine 1. Pump 4 draws oil from oil tank 5 through a conduit 6. Engine 3 drives a similar pump 7 in a similar manner, pump 7 being driven at a speed, the ratio of which to the speed of engine 3 is the same as the ratio of the speed at which pump 4 is driven to the speed of engine 1. Pump 7 is arranged with its inlet connected to the outlet of pump 4 and consequently pumps 4 and 7 are connected in series. Pump 7 has its outlet side connected by means of conduit 8 to conduit 6 which feeds the pump 4. The outlet conduit of pump 4 is designated 9 and the inlet conduit of pump 7 is designated 10. Between conduits 9 and 10 there is provided a restriction 11.

Disposed between conduit 9 and tank 5 is a pressure relief valve 12 located in a conduit 13 which connects conduit 9 to tank 5. Relief valve 12 operates when excessive pressure is generated in conduit 9 to allow a return of oil or other hydraulic liquid from the pump 4 to the tank 5. The relief valve 12 is so adjusted that the pressure required to operate it is greater than any pressure which will normally be required to be built up in conduit 9 in the operation of the throttle of engine 3.

Leading from conduit 9 is a conduit 14 which transmits the liquid pressure in conduit 9 into the dome 15 which has an air space 16 therein over the liquid contained therein. In fluid-pressure transmitting relationship with dome 15 there is disposed a conduit 17 which transmits the fluid pressure in the conduit 9 and in the dome 15 to a pressure-responsive throttle controlling device 18 associated with engine 3. This device 18 is of any suitable known type which will set the throttle of engine 3 at a speed which is proportional to the fluid pressure existing in conduit 9.

Instead of having conduit 17 communicate with the lower portion of the dome 15, it may, if desired, communicate directly with conduit 9.

The operation of the synchronizing device shown is as follows:

Assuming that the engines 1 and 3 are idling, suppose that the pilot operates the throttle of engine 1 so as to speed up engine 1. Pump 4 is thereupon speeded up to an extent which is directly proportional to the increase in speed of engine 1 and builds up a pressure between restriction 11 and pump 4 in the conduit 9. This pressure is transmitted through conduit 14, surge tank 15, and conduit 17 to the pressure-responsive throttle setting device 18, causing a proportional opening of the throttle engine 3. Engine 3 thereupon is speeded up and continues to be speeded up until pump 7 passes all of the oil discharged by pump 4 into the conduit 9. When pumps 4 and 7 are operating at the same speed, the pressure in the conduit 9 will be maintained constant and there will be no change in the speed of engine 3. If now, engine 1 is slowed down by the manual closing of its throttle 2, pump 4 is slowed down in proportion, and since pumps 4 and 7 are connected in series, pump 7 is not able to draw all of the liquid required by its inlet from pump 4. Accordingly pump 7 draws fluid from dome 15, thereby reducing the pressure in conduit 9 and causing the throttle of engine 3 to be proportionately closed until engine 3 is operating at the same reduced speed as engine 1. If pump 4 is running at a faster speed than pump 7, oil will be forced upwardly into the dome 15 and will increase the pressure in conduit 17, thereby opening the throttle on engine 3 through the intermediary of pressure-responsive device 18 until pump 7 is driven at the same speed as pump 4 whereupon this opening of the throttle will cease.

By reason of the connection of pumps 4 and 7 in series, and the use of restriction 11, a convenient and simple method for synchronization is provided. The dome 15 is considered necessary in order that its air cushion 16 may cushion any shocks caused by rapid increase in the pressure in conduit 9 by reason of a sudden speeding up of pump 4. Pressure relief valve 12 is provided solely for the purpose of operating in case something radically wrong develops in either engine 3 or pump 7. For example, if engine 3 should stop, pump 4 would build up an enormous pressure in conduit 9 with resulting damage unless the relief valve is operated. This damage would result because if pump 7 is stopped, it will be impossible for pump 4 to force oil therethrough.

While Figure 1 illustrates an arrangement for synchronizing two engines, it is to be understood that the principle of the invention may also be used for the synchronizing of more than one subsidiary engine with the master engine 1. To this end an arrangement of Figure 2 may be used according to which each of the subsidiary engines is provided with a positive delivery liquid pump 7, and all of these pumps are arranged in series with the pump 4. Between the inlet of each of the pumps and the outlet of the preceding pump there will be disposed a restriction 11, an air cushion dome 15 and a take-off conduit 17, leading to a pressure responsive throttle setting device associated with the throttle of each of these subsidiary engines. Thus each of the subsidiary engines will be governed in speed by the pressure developed between its restriction and the outlet of the preceding pump. Thus each of the subsidiary engines except the last one in the series may be said to be both a master engine and a subsidiary engine, it being a master engine with respect to the succeeding engine and a subsidiary engine with respect to the preceding engine. Thus the speed of engine 3 will be governed by the speed of engine 1 which is set manually by throttle 2, the speed of the succeeding engine will be governed by the speed of engine 3 and so on through the circuit.

I wish it to be understood that I intend to include as within my invention such modifications and adaptations thereof as are within the spirit of the invention as defined in the appended claims.

Having thus fully described my invention what I claim as new and desire to secure by Letters Patent is:

1. A synchronizing device comprising a hydraulic pump driven by a reference device, a hydraulic pump driven by a device to be synchronized, a conduit connecting said pumps in series, means continuously restricting the flow of fluid between said pumps, and means responsive to the liquid pressure built up in said conduit for controlling the speed of said device to be synchronized, whereby the speed of said device to be synchronized is made equal to the speed of said reference device.

2. A synchronizing device comprising a reference device, a hydraulic pump driven thereby, a device to be synchronized, a second hydraulic pump driven thereby, a conduit connecting said pumps in series, a restriction in said conduit, and pressure-responsive means connected to said conduit between said restriction and said first-named pump for controlling the speed of said second-named device in response to the pressure existing in said conduit between said restriction and said first-named pump, whereby said second-named device is synchronized in speed with respect to said first-named device.

3. A synchronizing device comprising a master prime mover, a subsidiary prime mover to be synchronized therewith, hydraulic pumps driven by said prime movers and arranged so that the output of said pump driven by said master prime mover is passed through said pump driven by said subsidiary prime mover when said prime movers are operating in synchronism, fluid flow restricting means arranged between the discharge opening of the pump pertaining to the master prime mover and the intake opening pertaining to the subsidiary prime mover, and means responsive to pressure between said pumps for controlling the speed of said subsidiary prime mover.

4. A synchronizing device comprising a master prime mover, a subsidiary prime mover having speed control means associated therewith and being adapted to be synchronized with said prime mover, hydraulic pumps driven by said prime movers and arranged so that the output of said pump driven by said master prime mover is passed through said pump driven by said subsidiary prime mover when said prime movers are operating in synchronism, pressure responsive means connected to said speed control means for actuating the same, and means for restricting the flow of the output of said pump driven by said master prime mover to said pump driven by said subsidiary prime mover.

5. A synchronizing device comprising a master prime mover, a hydraulic pump driven thereby, a subsidiary prime mover to be synchronized with said master prime mover, a hydraulic pump driven by said subsidiary prime mover, conduit means connecting the output of said first-named pump to the inlet of said second-named pump, liquid pressure responsive means associated with said subsidiary prime mover and in communication with said conduit means for controlling the speed of said subsidiary prime mover in accordance with the pressure in said conduit means, fluid flow restricting means arranged in said conduit means between said pumps, and closed gas-containing means in fluid communication with said conduit for cushioning rapid changes in pressure therein.

6. A synchronizing device comprising a master prime mover, a hydraulic pump driven thereby, a subsidiary prime mover to be synchronized with said master prime mover, a hydraulic pump driven by said subsidiary prime mover, conduit means connecting the output of said first-named pump to the inlet of said second-named pump, gas containing means having a hydraulic connection with said conduit means, liquid pressure responsive means associated with said subsidiary prime mover and in communication with said conduit means for controlling the speed of said subsidiary prime mover in accordance with the pressure in said conduit means, and restricting means in said conduit means located between the point where said liquid pressure responsive means and said gas-containing means are in communication with said conduit means and the inlet of said second-named pump.

7. In a mechanism for synchronizing multiple prime movers, a liquid pump driven by a master prime mover, a restriction in its outlet for causing it to build up liquid pressure, a liquid pump driven by a subsidiary prime mover having its inlet connected to the outlet of said first-named pump on the side of said outlet located beyond said restriction, pressure-responsive means associated with said subsidiary prime mover and adapted to control the speed thereof in accordance with the pressure transmitted to it, and means for transmitting the pressure built up between said first-named pump and said restriction to said pressure-responsive means.

8. In a mechanical for synchronizing multiple prime movers, a pump driven by a master prime mover and adapted to build up liquid pressure in proportion to the speed of said master prime mover, a restriction located in its outlet for causing the building up of said pressure, a pump driven by a subsidiary prime mover having its inlet connected to the outlet of said first-named pump after said restriction, and having its outlet connected to the inlet of said first-named pump, pressure-responsive means associated with said subsidiary prime mover and adapted to control its speed in proportion to the pressure transmitted to it, means for transmitting the pressure built up between said first-named pump and said restriction to said pressure-responsive means, and a fluid-tight gas-containing, surge-cushioning dome in free communication with the outlet of said first-named pump between said pump and said restriction.

9. In combination, in a mechanism for synchronizing multiple prime movers, a liquid pump drivingly connected with a master prime mover and adapted to supply pressure fluid to a second pump drivingly connected with a subsidiary prime mover, a liquid reservoir connected with the inlet of said first mentioned pump and with the outlet of said second mentioned pump, a restriction located in the conduit leading from the outlet of the first mentioned pump to the inlet of the second mentioned pump, to cause the building up of fluid pressure between the first mentioned pump and said restriction, and means for conveying said last mentioned pressure to a speed controlling device for said subsidiary prime mover.

HARRY A. TOULMIN, Jr.